Aug. 14, 1923.

J. V. M. RISBERG

CHURN

Filed June 21, 1921

1,465,179

2 Sheets-Sheet 1

Inventor
J.V.M.Risberg,
By Marks & Clerk
Attys.

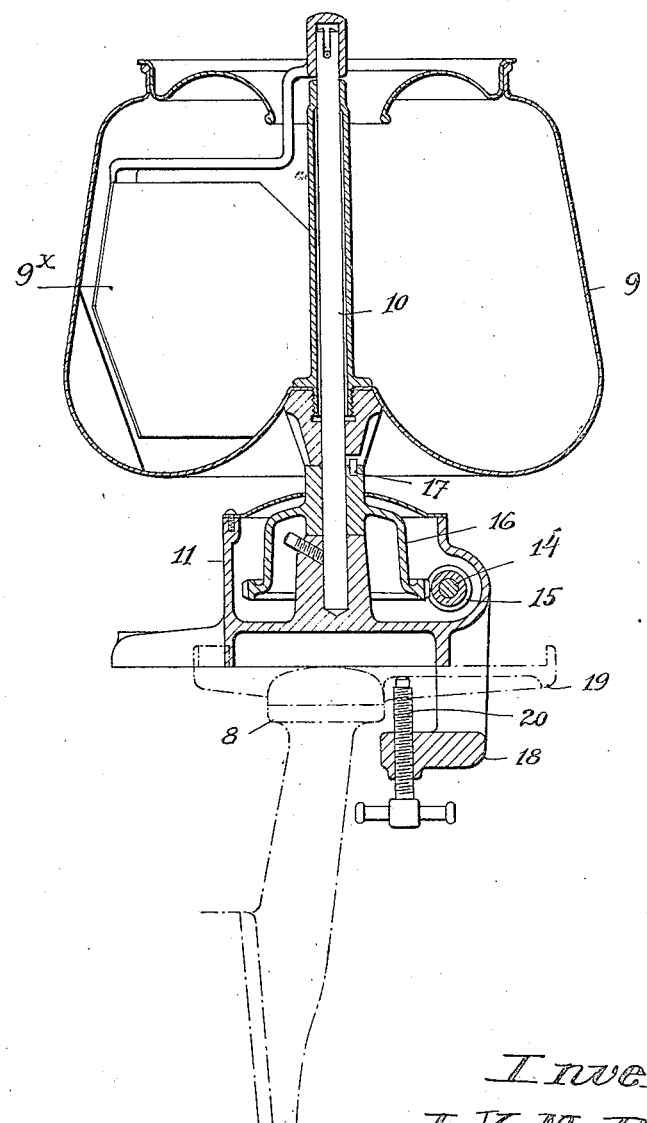

Patented Aug. 14, 1923.

1,465,179

UNITED STATES PATENT OFFICE.

JOHANNES VALDEMAR MÅRTEN RISBERG, OF SODERTELJE, SWEDEN, ASSIGNOR TO AKTIEBOLAGET BALTIC, OF STOCKHOLM, SWEDEN, A CORPORATION OF SWEDEN.

CHURN.

Application filed June 21, 1921. Serial No. 479,352.

*To all whom it may concern:*

Be it known that I, JOHANNES VALDEMAR MÅRTEN RISBERG, a subject of the King of Sweden, residing at Saltsjogatan 7, Sodertelje, Sweden, have invented certain new and useful Improvements in Churns, of which the following is a specification.

Owing to the fact that cream separators for hand power nowadays are more generally driven by means of small electric motors, the desire has arisen to effect the butter making in the same easy manner. For the said purpose the motor used for the driving of the cream separator would, of course, be the most convenient. This, however, is not possible without very extensive arrangements, due to the fact, that the churns put on the market are not adapted to actuation by an ordinary high-speed motor. According to this invention the churns are so arranged, that the separator and churns may be driven by a motor common to the same.

Figure 1:
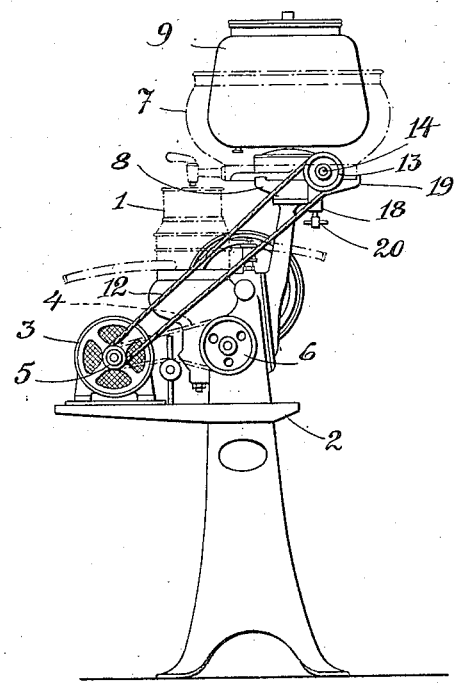
Figure 2:
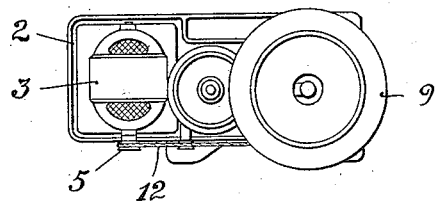

In the accompanying drawings Fig. 1 is a side view and Fig. 2 a plan view of a separator and a churn mounted on the same frame and driven by the same motor. Fig. 3 shows the gearing of the churn.

The separator 1 is mounted in the ordinary manner on the one end of a base plate 2, the other end of which carries an electric motor 3 of a size suitable for the driving of the separator. As a rule the said motor is quite sufficient for driving a churn, corresponding to the size of the separator, owing to the fact that the amount of power for churning is not greater than the amount of power for skimming, especially if churning is effected twice a week, as generally is the case. The churning operation may, evidently, not be effected at the same time as the separating operation. The said separator 1 is driven in the well known manner by the motor 3 by means of a rope 4 and rope pulleys 5 and 6 provided on the shaft of the motor and the worm wheel shaft of the separator respectively. When churning is to be effected, the milk tank 7, belonging to the separator, is removed and on its place, consequently on the milk tank bracket 8, a special gearing made for the purpose and adapted to drive a churn 9 is mounted. The churn 9 is rotatably mounted on a spindle 10 fixed in the bottom of a casing 11, containing the said gearing. The rope pulley 5 of the motor 3 is by means of a special rope 12 connected with a rope pulley 13 fixed to a shaft 14 belonging to the said gearing. The gearing shown in Fig. 3 is adapted to a churn of the general type and consisting of a vessel of sheet metal and provided inside with a stationary stirrer 9ˣ on spindle 10. The said gearing comprises a worm 15 provided on the shaft 14 and a worm wheel 16, rotatably mounted on the spindle 10 and connected with the churn 9 by a conveyor pin 17. The dimensions of the said worm and worm wheel are so adapted that at a speed of the churn of about 200 turns per minute the number of turns of the shaft 14 is about the same as the number of turns of the motor, which generally is 1500 to 2000 per minute. Consequently, the number turns of the shaft 14 ought to be about 1000 per minute. The rope pulley 13 of the shaft 14 has such a diameter, that the rope pulley 5 of the motor may be used for driving the separator as well as the churn without changing the position of the motor.

The casing 11 of the gearing is provided at its lower side with a lug 18, which embraces an arm 19, extending from the bracket 8 and located in the central vertical plane of the separator. The said lug 18 is provided with a set screw 20, by means of which the casing 11 is jammed to the said arm 19. Owing to the said arrangement the driving rope 12 may be tightened, when necessary, by moving the casing 11 outward on the arm 19, so that the distance between the rope pulleys 5 and 13 is increased.

If a churn of a type different from the one shown in the drawings is used, the details of the gearing evidently are adapted to the same.

The advantages of the device described above, besides other ones, consist in that the same motor and rope pulley may be used for the driving of the separator and churn, that the motor may remain on its ordinary place on the base plate of the separator during the churning operation, and that the driving rope extended from the motor to the churn is not a hindrance and may easily be tightened, when necessary.

I claim:

In a device of the character described, a holder for a milk tank when used as a centrifuge, churning means, a churn supporting and driving means including a casing detachably secured upon said holder, a shaft mounted in said casing and carrying the churn, driving gearing in said casing and operative to actuate said churning means, and actuating means for said centrifuge operatively connected to said driving gearing for operating the same.

In testimony whereof I have affixed my signature in presence of two witnesses.

JOHANNES VALDEMAR MÅRTEN RISBERG.

Witnesses:
AXEL EHRUCR,
W. C. ERIKSON.